United States Patent [19]
Shen et al.

[11] Patent Number: 6,084,999
[45] Date of Patent: Jul. 4, 2000

[54] OPTICAL COUPLER ASSEMBLY AND METHOD MAKING THE SAME

[75] Inventors: Paisheng Shen, Fremont; Zhong Ming Mao, Santa Clara; Peter C. Chang, Mountain View, all of Calif.

[73] Assignee: Alliance Fiber Optics Products, Inc., Sunnyvale, Calif.

[21] Appl. No.: 08/969,119

[22] Filed: Nov. 12, 1997

[51] Int. Cl.⁷ .................................................... G02B 6/26
[52] U.S. Cl. ............................................................ 385/43
[58] Field of Search .................................. 385/43, 96, 51

[56] References Cited

U.S. PATENT DOCUMENTS 5,627,930  5/1997  Ishiguro et al. ........................... 385/43
5,694,509  12/1997  Uemura et al. ........................... 385/99

Primary Examiner—Akm E. Ullah
Attorney, Agent, or Firm—Wei Te Chung

[57] ABSTRACT

A coupler (30) includes an enclosure (32) sealing therein a fiber assembly (34) consisting essentially of a pair of fibers (36). The fiber assembly (34) includes a hourglass-like configuration (38) on the middle portion wherein a reinforcement structure (40) is applied to the neck portion (42) of said fiber assembly so as to enhance the strength thereof, so that the whole coupler (30) can own a better mechanical character for convenient and reliable usage.

3 Claims, 2 Drawing Sheets

OPTICAL COUPLER ASSEMBLY AND METHOD MAKING THE SAME

BACKGROUND OF THE INVENTION

1. Field of The Invention

The invention relates to an optical coupler device, and particularly to the optical coupler having reinforcement structure on the fragile neck portion for efficiently resisting any exterior influence.

2. The Related Art

The optical coupler are popularly used in an optical transmission system. As well known and shown in FIG. 1, the typical coupler 10 includes a pair of generally mutually parallel optical fibers 12 extending through a tubular enclosure 14 wherein each optical fiber 12 has an axial core portion 15 extending therethrough in the center thereof for allowing the light to move therein. The middle portions 16 of such pair of optical fibers 12 deformably move toward each other in a very close manner and form a hourglass sectional configuration in the enclosure 14 whereby the light moving along one fiber 12 may transmit to the adjacent fiber 12 around the neck portion 18 (i.e., the active area) of aforementioned hourglass configuration. This is because the core portion 15 of the one fiber 12 becomes much closer to that of the other and the light can easily leak or jump to another adjacent fiber 12. Interchangeability of the light between such two fibers defines coupling function of the light transmission, and this is the reason why the coupler is so called.

The typical method to make the hourglass-like configuration of the fiber assembly in the coupler is described below. First, two ends of the such pairs of side-by-side fibers 12 are held by suction device, and simultaneously oppositely and outwardly pulling forces are applied to two opposite ends of each fiber 12 to have both fibers in a tension status. Successively, a torch or other heat source is applied to the middle portions of the closely parallel fibers 12 to soften such specific positions thereof. Therefore, the fibers around such heated area may become narrower or thinner, and such area naturally becomes a neck portion 18 of a hourglass-like configuration. Under this situation, the inner core portion 15 of such pair of fibers 12 are moved much closer to each other as shown in FIG. 1, thus facilitating implementation of the coupling performance thereabouts. It can be understood that the closer these two fibers 12 are with each other, the higher the percentage of interchangeability of the transmitted lights. Anyhow, there is a limitation regard the dimension of such neck portion 18 wherein the maximum limitation should meet the minimum interchangeability ratio between such pair of fibers 12, and the minimum limitation should own the desired strength to resist the structure fatigue due to any external impact or vibration. Nevertheless, for achievement of better coupling effect, most coupler manufacturers can not help but make the neck portion 18 with a dimension of the critical value around such minimum limitation. Under this situation, such coupler 10 is so fragile and sensitive in comparison with other fiber optics components from a mechanical viewpoint. Any server vibration or improper impact, or falling on or of the coupler 10 results in large, relative to the tiny neck portion, external forces and inertia forces, and may cause breaking around the neck portion 18 of the fibers 12. This unavoidable issue results in high difficult and complexity and high defective ratio for the manufacturer. Understandably, there is really a desire to obtain a coupler having not only a required optical coupling performance to implement the designated purpose, but also a sufficient strength to allow practical and reliable usage of the product.

Therefore, an object of the invention is to provide a coupler and the method making the same wherein a reinforcement means is applied to the coupler so that the coupler may have a better mechanical property and allow larger tolerance during manufacturing.

SUMMARY OF THE INVENTION

According to an aspect of the invention, a coupler includes an enclosure sealing therein a fiber assembly consisting essentially of a pair of fibers. The fiber assembly includes a hourglass-like configuration on the middle portion wherein a reinforcement structure is applied to the neck portion of said fiber assembly so as to enhance the strength thereof, so that the whole coupler can own a better mechanical character for convenient and reliable usage.

DETAILED DESCRIPTION OF THE PREFERRED EMBODIMENTS

References will now be in detail to the preferred embodiments of the invention. While the present invention has been described in with reference to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

Figure 1:
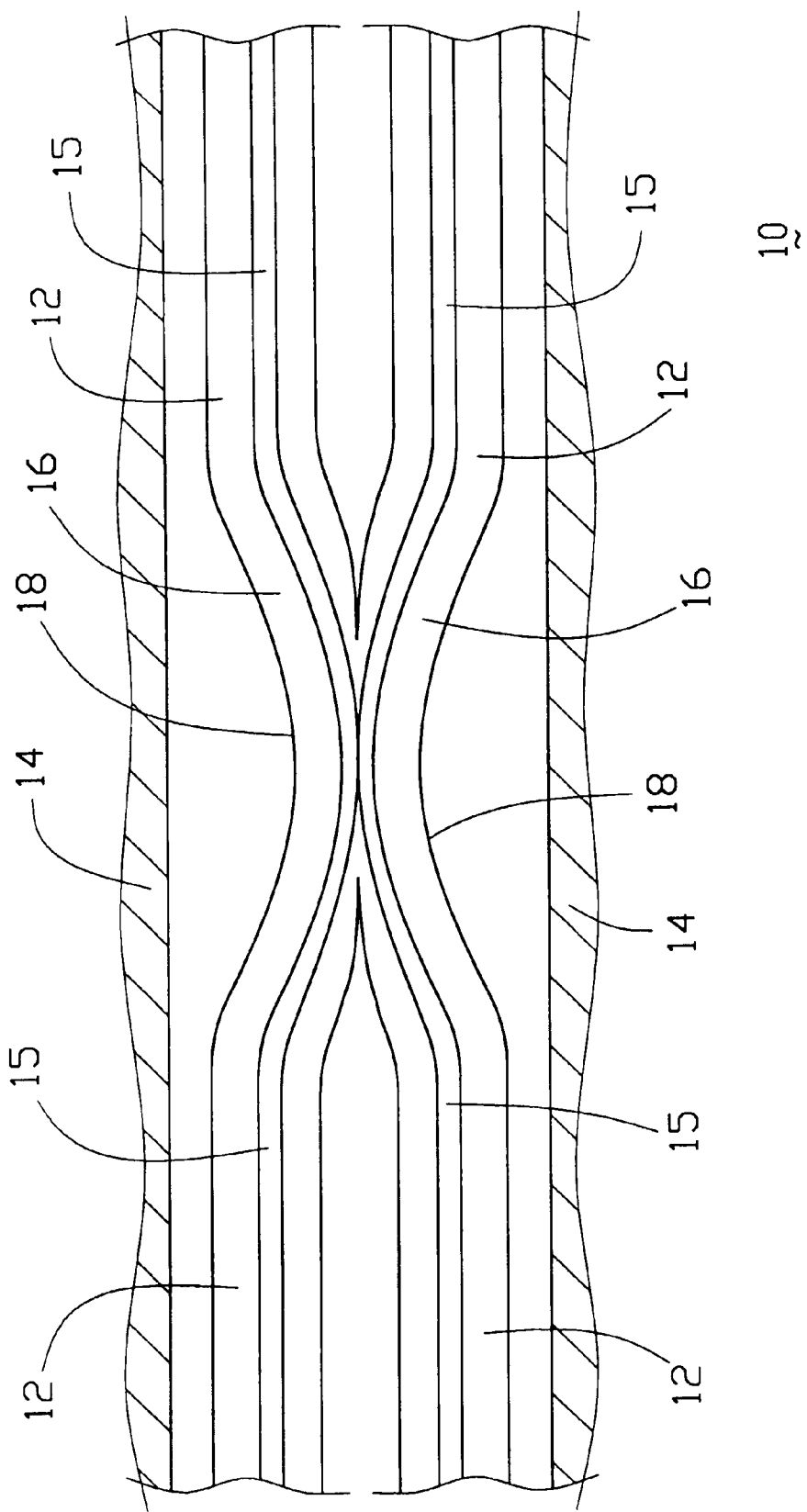
FIG. 1 is a cross-sectional view of a coupler of the prior art.
Figure 2:
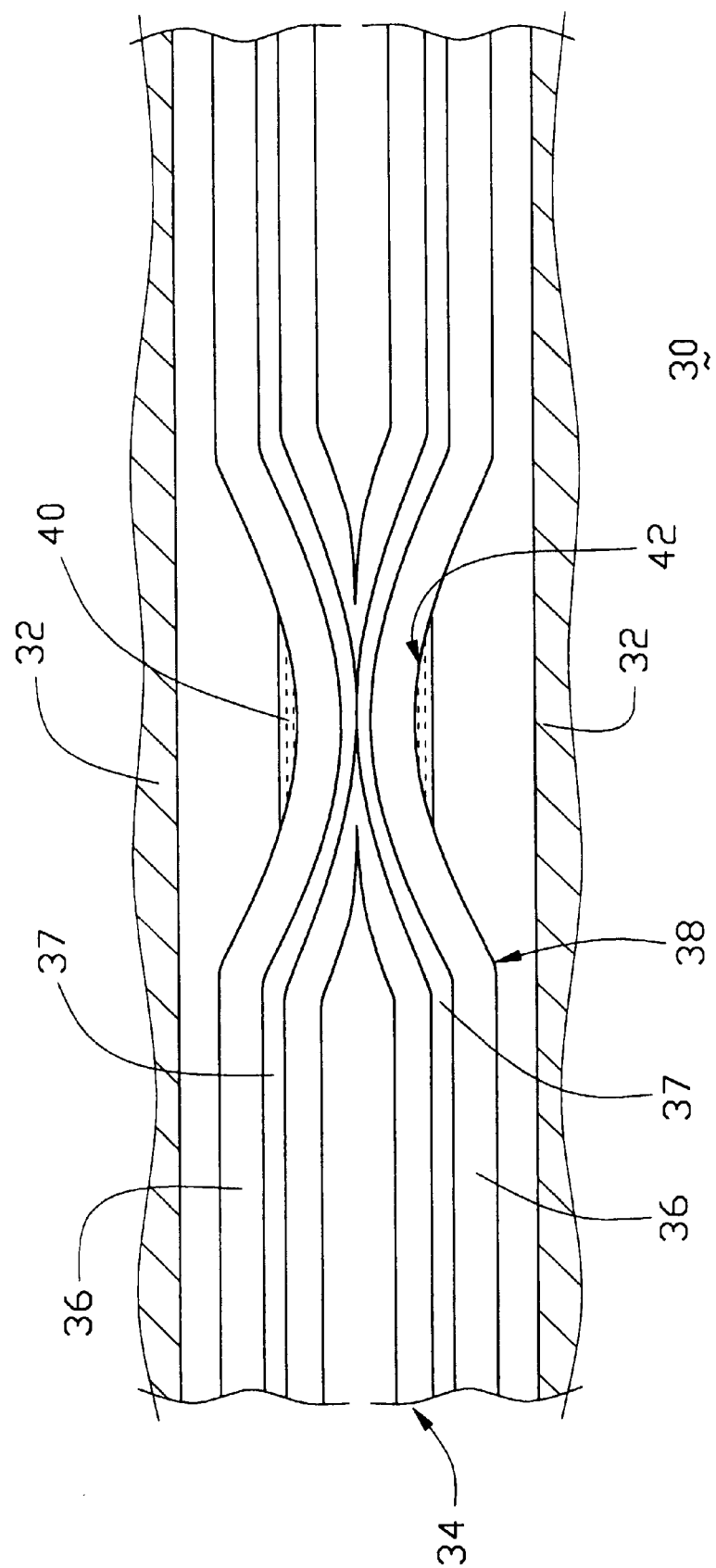
FIG. 2 is a cross-sectional view of a presently preferred embodiment of a coupler, according to the invention.

It will be noted here that for a better understanding, most of like components are designated by like reference numerals throughout the various figures in the embodiments. Attention is directed to FIG. 2 wherein a coupler 30 includes an enclosure 32 enclosing therein a fiber assembly 34 consisting of a pair of fibers 36 closely juxtaposed with each other wherein each fiber 36 has a core portion 37 extending therethrough in the center. The fiber assembly 34 forms a hourglass section 38 on the middle portion and a protective reinforcement layer 40 is circumferentially coated unto the neck portion 42 (i.e., the active area) thereof wherein the refraction index N1 of the material of such layer 40 is smaller than the refraction index N2 of the fiber 36. There are sealing at two ends of the enclosure 32 for properly retaining the fiber assembly 34 in the enclosure 32.

It can be noted that the layer 40 not only provides reinforcement on the neck portion 42 for efficiently resisting vibration or impact imposed on the coupler 30, but also functions as a protective device for avoidance of bad effects due to any external material, such as vapor or ash which may invade into the inner space in the enclosure 32 from leaks of the sealing, and jeopardize the property of fiber through the neck portion which has a narrowed dimension and weak internal structure for resisting invasion from an exterior into the inner core portion 37 of the fiber 36.

Other issue having to also be paid attention to, is that because the neck portion 42 is so fragile and weak, the layer 40 must be carefully, delicately and gently applied thereunto. Therefore, a spray of some specific material method is preferably recommended for avoiding any improper force imposed to such portion and resulting in breaking thereabouts, wherein such specific material should own the character of a lower refraction index than the fiber for assuring no improper refractive dissipation occurring thereabouts through such layer 40.

It can be understood that the manufacturing method of the invention may be similar to the prior art except that an additional reinforcement material coating process is added thereto after before the fiber assembly 34 has been permanently bounded within the enclosure of the coupler.

In conclusion, the invention provides reinforced neck portion of the fiber assembly within the enclosure of the coupler so that reliability and impact-resisting capability of the coupler are significantly increased, and the defective rate is relatively reduced. This benefits both the manufacturer and the user.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included within the scope of the following claims.

We claim:

1. A coupler including:

an enclosure;

a fiber assembly positioned within said enclosure;

said fiber assembly including at least two fibers and defining a narrowed neck portion wherein means for reinforcement is applied unto said neck portion so as to increase strength thereabouts to resist, external or inertia forces imposed thereon; and said means is a coated layer, by spraying, having a lower refractive index than the fiber.

2. The claim as defined in claim 1, wherein said means surrounds the neck portion.

3. A coupler including an enclosure with a fiber assembly comprising a pair of fibers therein, each fiber including a core extending along an axial direction of the fiber, a minimum distance between two cores of the two fibers occurring around a narrowed portion along said fiber assembly wherein said narrowed portion is provided with a rugged or reinforced surface thereon, and said narrowed portion is coated with a layer, by spraying, having a lower refractive index than the fiber.

* * * * *